United States Patent [19]

Lipman

[11] Patent Number: 4,949,022
[45] Date of Patent: Aug. 14, 1990

[54] SOLID STATE DC FAN MOTOR

[76] Inventor: Leonard H. Lipman, 1410 Magnolia, Humble, Tex. 77339

[21] Appl. No.: 303,320

[22] Filed: Jan. 27, 1989

[51] Int. Cl.$^5$ .......................... H02K 9/04; F04B 35/04
[52] U.S. Cl. ..................................... 318/254; 310/63; 417/423.7; 318/696
[58] Field of Search ............. 318/254, 696; 310/49 R, 310/49 A, 62, 63; 417/355, 356, 423.1, 423.7; 416/189 A, 189 B, 189 R, 190, 192; 123/41.11

[56] References Cited

U.S. PATENT DOCUMENTS

| | | | |
|---|---|---|---|
| 2,536,130 | 1/1951 | Herrman | 416/189 R |
| 3,034,762 | 5/1962 | Fanti et al. | 416/190 |
| 3,048,365 | 8/1962 | Foster et al. | 416/190 |
| 3,680,977 | 8/1972 | Rabouyt et al. | 416/192 X |
| 3,937,192 | 2/1976 | Longhouse | 416/189 R |
| 4,360,751 | 11/1982 | Arnold et al. | |
| 4,459,087 | 7/1984 | Barge | |
| 4,504,751 | 3/1985 | Meier | |
| 4,505,641 | 3/1985 | Tsuchikawa et al. | 416/192 X |
| 4,553,075 | 11/1985 | Brown et al. | |
| 4,563,622 | 1/1986 | Deavers et al. | |
| 4,603,271 | 7/1986 | Maruyama et al. | |

FOREIGN PATENT DOCUMENTS 1197850   7/1970   United Kingdom ................ 416/192

*Primary Examiner*—Bentsu Ro
*Attorney, Agent, or Firm*—James L. Jackson

[57] ABSTRACT

A direct current electrical fan motor for use in small electrical equipment such as down sized personal computers and the like incorporates a fan housing forming a circular fan opening and having a bearing support located centrally of the fan housing. A plurality of electrical coils are supported by the housing in spaced relation about the inner periphery of the fan housing. The fan housing also forms a circular internal channel at the inner peripheral portion thereof. A fan is provided centrally of the housing and is rotatably supported by the bearing. The fan incorporates a plurality of fan blades radiating from a central rotor and having a circular structural member supporting the tips of the blades against vibration. A plurality of permanent magnets are supported by the circular structural member and are movable within the internal channel of the housing upon rotation of the fan, thus moving in close proximity to the spaced coils of the housing during rotation of the fan. A solid state circuit is provided for commutation of the permanent magnets of the fan rotor. Indexing for the motor control circuit may be provided by an LED circuit including an LED, a light sensor and a reflector fixed to a portion of the rotating fan element.

15 Claims, 2 Drawing Sheets

FIG. 1
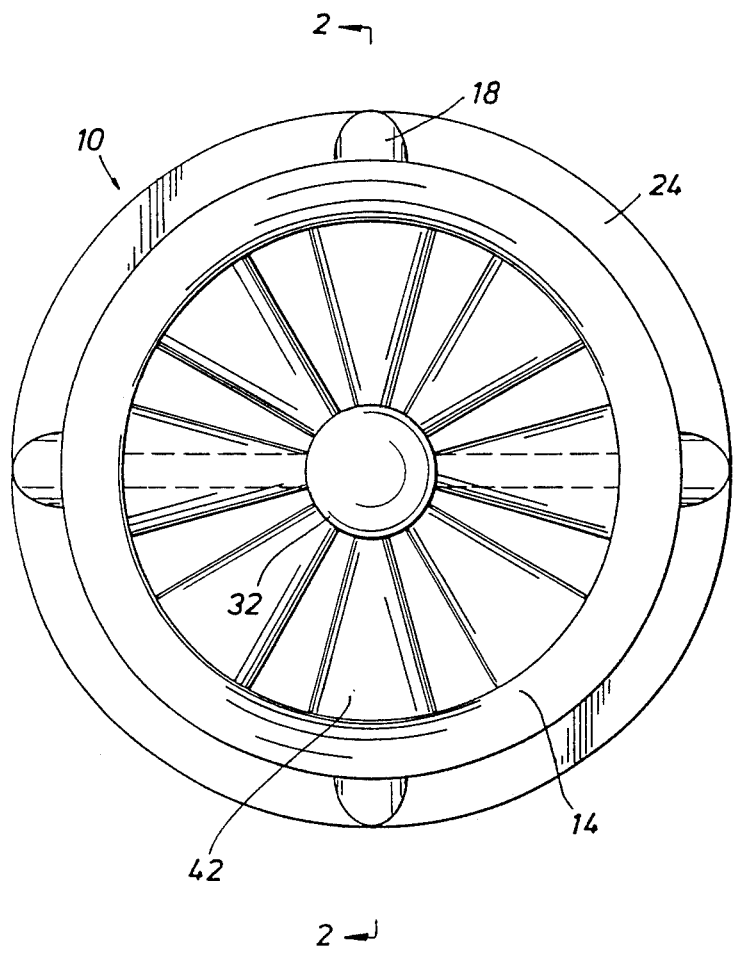
FIG. 2
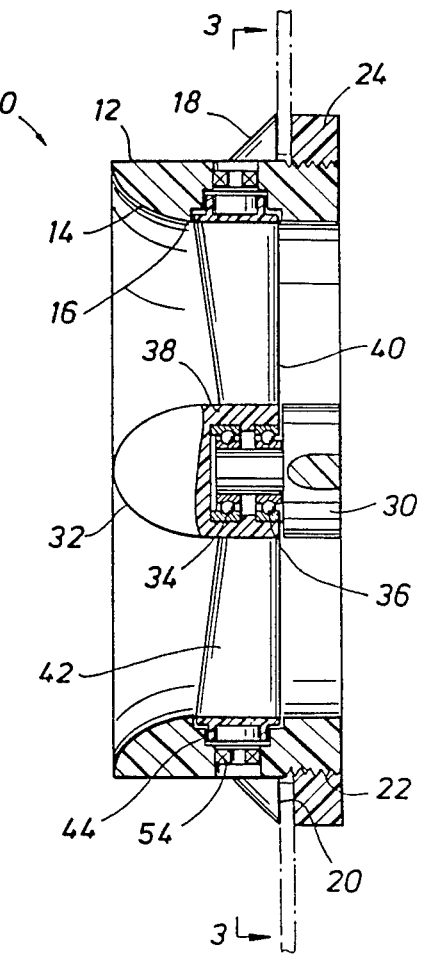
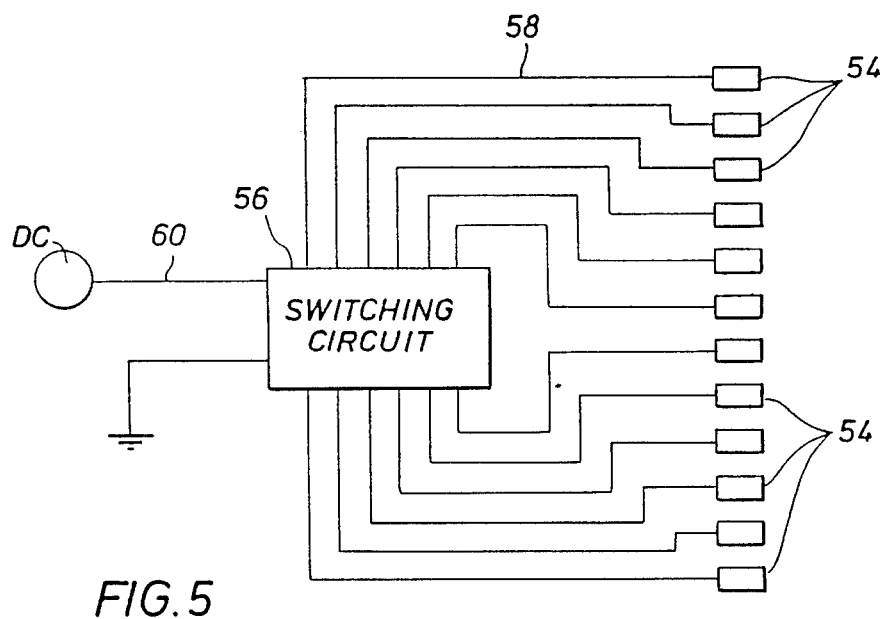
FIG. 5

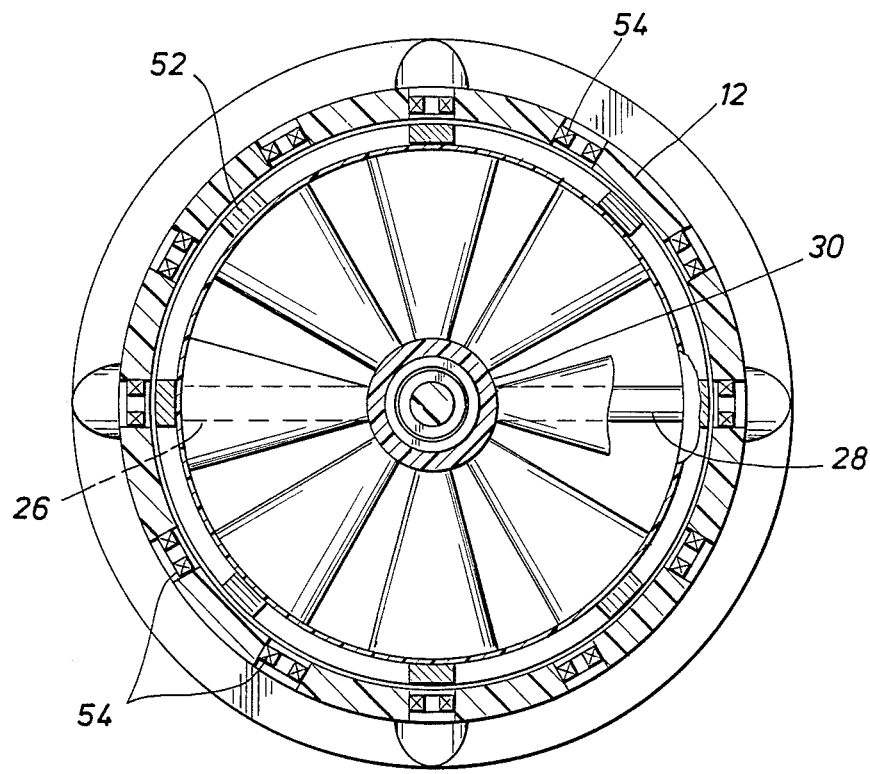
FIG. 3
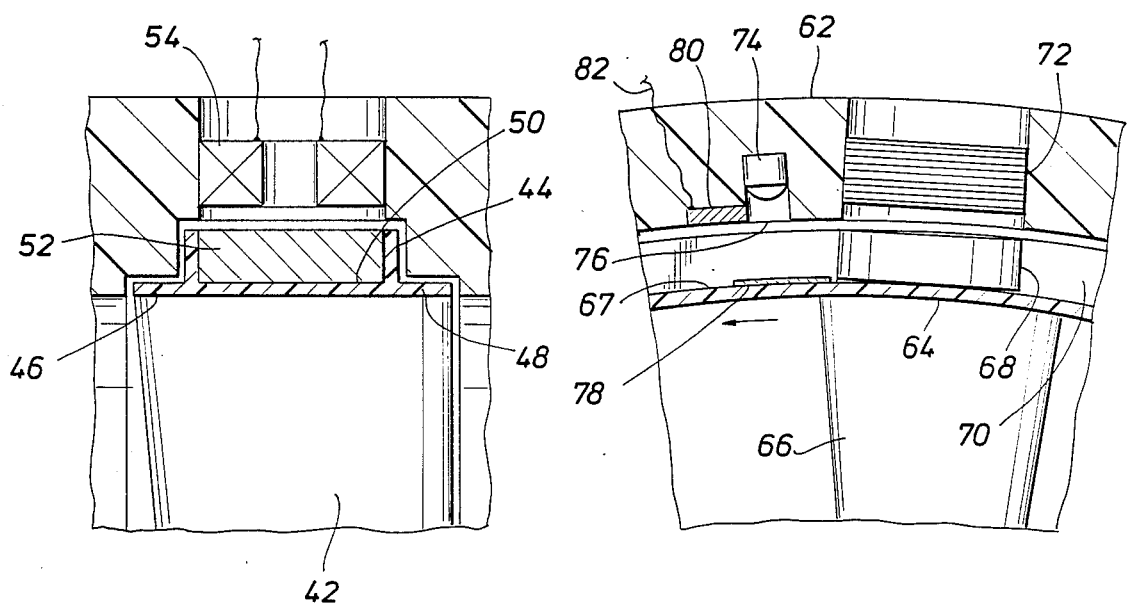
FIG. 4
FIG. 6

SOLID STATE DC FAN MOTOR

FIELD OF THE INVENTION

This invention relates generally to electric motors and more specifically brushless DC electric motors that are constructed in conjunction with a fan such as is typically employed to provide cooling for computers and other such electrical equipment.

BACKGROUND OF THE INVENTION

Virtually all down size computer equipment and small electronic equipment incorporate cooling fans that are continuously energized with the electrical equipment to remove heat that is developed in the electrical circuitry during operation of the equipment. Since the electrical equipment is typically of small size and of light weight, it is desirable that a cooling fan for the equipment also be of light weight.

While the present invention is discussed herein particularly as it relates to electrically energized computer fans, it is not intended to limit utilization of the invention exclusively to computers, it being obvious that the brushless DC fan motor of this invention may find effective use in conjunction with other electrical equipment and may be employed other than to drive a cooling fan. For purposes of simplicity, this invention is discussed herein particularly as it relates to small, light weight electrically energized fans for cooling down sized computers.

Earlier fan motors of similar construction and utilization employ a solid ring of alternating polarity magnets which add weight and cost to the particular fan unit that is involved. These earlier fan motors also typically detect and employ the Hall effect current to commutate the coil or coils. The Hall effect is described as the change of the electrical conduction caused by that component of the magnetic field vector applied normal to the current density vector, which causes the angle between the current density vector and the electric field to change from the magnitude that existed prior to the induction of the magnetic field. The additional circuitry required for detection employment of the Hall effect obviously adds to the expense and detracts from commercial feasibility of the particular motor that is involved. A parking magnet has also been utilized in at least one type of electrically energized fan motor to index the fan disc in order to initiate rotation and to control the direction of motor rotations at start up. Specifically, prior art patents disclosing these particular fan motor designs are depicted particularly by U.S. Pat. Nos. 4,553,075 and 4,563,622. These fan motors each utilize a single electromagnetic coil which should produce uneven magnetic forces on the fan disc resulting in torque/flutter. This induces vibrations as the fan motor unit is operated, which vibration causes obvious mechanical problems with the fan motor itself and with the electrical equipment with which the fan motor is employed. It is desirable, therefore to provide a novel, electrically energized direct current fan motor unit employing a plurality of coils and permanent magnets for operation thereof and which is designed to minimize or eliminate the introduction of torque/flutter and vibration that would otherwise be present. It is also desirable to provide an electrically energized fan motor system that does not require the presence of a Hall effect circuit and large, annular permanent magnets for operation of the motor.

In conventional electric motors a commutator and brush system is employed for sequentially activating the coils and thereby develop the electromotive force for motor operation. In addition to the weight established by large permanent magnets and large electrical coils, the presence of a commutator and brush system for coil activation also significantly adds to the weight and expense of the electric motor system. It is desirable, therefore, to provide a novel brushless electric motor which functions responsive to direct current to drive an air blower fan or other suitable equipment. It is desirable to provide a novel electric motor system wherein solid state switching is employed for the control of sequential coil activation to thereby provide the electromotive force necessary for motor operation.

Fans for computers and other electrical equipment are typically quite noisy due to the presence of torque/flutter, vibration, turbulence and acoustical noise. It is desirable to provide a novel electric fan motor system that is of quite simple nature and does not develop significant noise and vibration during operation thereof.

Many fan motors in use at the present time for cooling of computers and other electrical equipment incorporate central hub motors of significantly large size and thereby require the fan itself to be of large size to accommodate sufficient openings for movement of a desired volume of air for cooling. It is desirable therefor to minimize the physical size of the central hub portion of the fan system, thereby allowing the fan to be of relatively small dimension and yet define an air flow opening of sufficient dimension for efficient air flow at a desired rate for efficient cooling.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is a front elevational view of an electrically energized fan constructed in accordance with the present invention.

FIG. 2 is a sectional view of the electrically energized fan taken along line 2—2 of FIG. 1.

FIG. 3 is a sectional view taken along line 3—3 of FIG. 2.

FIG. 4 is a fragmentary sectional view of the upper portion of FIG. 2, illustrating the magnet support structure of the fan rotor in detail.

FIG. 5 is an electrical schematic diagram of a solid state switching circuit for sequential activation of the coils with which the motor mechanism is provided.

FIG. 6 is a fragmentary sectional view illustrating a portion of an electrically energized fan representing an alternate embodiment of this invention incorporating indexing by means of a light emitting diode circuit.

DETAILED DESCRIPTION OF PREFERRED EMBODIMENT

Referring now to the drawings and first to FIGS. 1 and 2 an electrically energized fan is shown generally at 10 which incorporates an annular housing 12 defining a curved surface 14 which extends from the outer periphery of the housing to the inner periphery. The curved surface 14 functions as an air entry surface permitting smooth flow of air to the inlet opening of the fan. The inner periphery 16 of the housing 12 is of generally circular form and defines the opening or air flow passage of the housing.

The housing 12 defines radial stop means 18 which may be in the form of a circular radiating stop or a plurality of stop projections. The stop means 18 defines a planar stop surface 20 which is disposed for contact with a structural fan supporting member of the computer or other electrical equipment. The outer portion of the housing 12 defines an externally threaded section 22 which is adapted to receive an internally threaded retainer or mounting ring 24. After the fan housing has been placed within an opening defined by the structural member of the electrical equipment such that stop means 18 is in contact with the structural member, the mounting ring 24 is threaded into place to firmly lock the fan housing in assembly with the structural member. The structural member may simply be in the form of a support formed of sheet metal and having a circular opening therein of sufficient dimension for receiving the housing 12 of the fan unit.

As shown in FIGS. 2 and 3 the fan housing 12 is provided with a pair of transverse braces 26 and 28 which are formed integrally with or otherwise secured to the fan housing and which are positioned in radially opposed relation. The transverse braces are integral with or otherwise connected to a bearing housing 30. The bearing housing defines a smoothly curved surface 32 that also functions to minimize resistance of the bearing housing to air flowing through the flow passage of the housing. One or more bearings such as shown at 34 and 36 are employed to establish a low friction rotatable connection between the bearing housing and the central hub 38 of a fan rotor 40. The fan rotor incorporates a plurality of fan blades 42 which extend in radiating relation from the rotor hub 38. The fan blades 42 may in fact be formed integrally with the hub 38 such as by a molding operation if desired.

A circular channel member 44 is fitted about the rotor 40 in such manner that the tips of each of the rotor blades 42 are in contact with opposed cylindrical flanges 46 and 48 which define opposed axial extremities of the ring like channel member. If desired, the circular channel may also be integral with the rotor and rotor blades. The fan may be molded from Nylon or ABS polymer material or any other suitable material. The channel member defines a pair of spaced circular, radial flanges which project away from the tips of the fan blades 42 and thereby define an annular receptacle 50 extending about the entire outer periphery of the rotor. A plurality of permanent magnets 52 are positioned within the circular receptacle 50 of the channel member and are secured therein such as by means of epoxy or by any other suitable means. The structure forming the channel member 44 may be formed as an integral part of the fan structure such as by a molding operation if desired. The permanent magnets 52 are disposed in appropriately spaced relation for coordinated registry with a plurality of electrical coils 54. As shown in the sectional view of FIG. 3, a plurality of small electrical coils are supported by the outer periphery of the housing 12 in equally spaced relation about the periphery of the housing and are positioned such that the permanent magnets 52 will come into close proximity with the respective coils during rotation of the rotor 40.

As mentioned above present brushless direct current electrical motors utilize the Hall effect for communication of the rotor. A sensor is typically provided to sense the Hall effect current and use it for rotor communication. For example, as taught in U.S. Pat. No. 4,563,622 a Hall switch can be employed to control a transistor whose collector-emitter circuit is in series with the stator coil of the motor. In this case exposure of the Hall effect device to a magnetic field of current polarity opens a conduction path from line to ground, thereby causing a resistor to supply base drive to the transistor. This biases the transistor into conduction and causes the coil to be energized. When reverse polarity or no polarity is sensed by the Hall effect device, the current path to the base of the transistor is closed, starving the base drive of the transistor and causing it to be non-conductive. The coil is thus deenergized until a magnetic field of the proper polarity is again sensed. The motor of this invention does not rely on a Hall effect sensor to control the commutation of the electrical coils. A solid state circuit sequentially energizes the peripheral electrical coils in a rotational pattern which induces rotation in the disc. A parking magnet is not required to index the fan disc nor is the position of the magnets relative to the coils critical for operation of the unit.

As shown schematically in FIG. 5, a solid state switching circuit is provided as shown at 56 which includes multiple coil energization circuits 58 that are electrically coupled to respective electrical coils 54 of the fan housing 12. The switching circuit 56 is energized by electrical power via conductor 60 from a suitable source S of direct current electrical energy. The coils 54 are sequentially energized under the control of the solid state switching circuit 56 to develop a properly polarized magnetic field that is attractive to and/or repulsive to the respective poles of the magnets 52. As the solid state switching system of the brushless direct current fan motor is energized sequential coil activation is developed responsive to the solid state switching circuit. This causes a sequence of electrical pulses to begin at a slow rate and steadily build to a predetermined rate that is suitable to the rotational speed (rpms) desired of the fan motor. The switching circuit also functions as a "governor" to control the maximum RPM of the fan at its operating speed. With this type of solid state switching the need for brushes, armature and commutator is eliminated. This in turn eliminates the need for parts that can wear and also eliminates the electrical noise that is ordinarily developed in electric motors by arcing between the brushes and commutator. This results in the provision of a very simple, quite efficient electrically energized fan.

The central hub of the fan motor unit is quite small, only being of sufficient dimension to accommodate the bearings for support of the motor, and thus, even in a fan of small dimension, the flow passage through the fan can be significantly great as to provide a large volume of air flow. The rectangular mounting flange that is common to most fans of this general nature is eliminated by a threaded locking collar or retainer 24 that simply threads onto the housing to lock the housing securely to the structure of the electrical apparatus. Two micro ball bearings are utilized to support the central hub but bushings can be substituted to eliminate the somewhat noisy but reliable ball bearings. Because the central hub is quite small, it does not need numerous strut members. Only two struts are required for support of the central hub or bearing housing. These struts are streamlined to minimize turbulence and acoustical noise as air is caused to flow through the fan responsive to rotation of the fan blades. The streamlined fan profile that is presented by the fan unit provides an air flow output diameter that is not reduced by the bulk of a centrally located electric motor as is the case with conventional electric motors. Basically the result is a smaller, longer lasting, quieter and more efficient cooling fan which is desirable for small electronic equipment such as microcomputers and the like.

Referring now to FIG. 6 an alternative embodiment of the present invention is illustrated wherein indexing of the electric motor mechanism is accomplished by means of a light emitting diode (LED) circuit. The alternative embodiment of FIG. 6 illustrates a housing structure 62 similar to that shown in FIG. 3. The housing 62 defines a circular internal opening 64 within which is rotatably mounted a fan structure also similar to that shown in FIG. 3. The fan structure incorporates a plurality of fan blades 66 with the fan forming an external channel 67 having disc magnets 68 provided at the radially outer portion thereof. The disc magnets traverse an internal circular channel 70 which is defined by the housing 62. The fan housing supports a plurality of electrical coils 72 in similar manner as discussed above in connection with FIG. 3 and shown specifically in FIG. 4.

As mentioned above, a Hall effect circuit is not employed in the electrically energized fan motor of this invention. According to the invention of FIG. 6, indexing of the motor mechanism is accomplished by means of an LED circuit incorporating an LED 74 which is supported by the housing 62 and which projects light through an aperture 76 of the housing onto a reflector 78 which is supported in the external channel 67 of the fan. Typically, the reflector 78 will be affixed to the bottom surface of the channel 67 though it may be supported in any other manner. A light sensor 80 which is also supported in fixed relation by the housing 62 is adapted to receive reflected light from the reflector 78 and to provide an electrical signal that is amplified and otherwise processed by the electronic circuitry to provide control for the fan mechanism to insure that the fan is always energized for rotation in a desired direction.

The lead 82 is connected with the light sensor 80 and is operative to transfer signals of the light sensor to the control circuitry of the motor.

In operation, light from the LED 74 passes through the housing and is directed from the aperture 76 to the reflector which is mounted on the spinning annular channel of the fan. The light reflected onto the light sensor generates an electrical current which triggers the energizing of the electromagnetic coils and ensures that the motor and fan rotate in the proper direction.

The motor mechanism of this invention does not require Hall effect circuits and does not include large annular permanent magnets for its operation. The motor mechanism therefore is of very light weight and may be efficiently incorporated within small electronic equipment such as down sized personal computers without adding significantly to the weight of the computer system. Moreover, the motor mechanism has an operational characteristic of low noise and virtually no vibration. It is therefore suitable for use as a fan motor in small electronic equipment.

It is therefore seen that this invention is one well adapted to obtain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by, and is within the scope of the present invention.

As many possible embodiments may be made of this invention without departing from the spirit or scope thereof, it is to be understood that all matters hereinabove set forth and shown in the accompanying drawings are to be interpreted as illustrative and not in a limiting sense.

What is claimed is:

1. A direct current electric fan motor for use on small electrical equipment, comprising:
   (a) a fan housing forming a circular fan rotor opening and a circular internal recess and having a bearing support located centrally of said fan rotor opening and bearing means positioned by said bearing support;
   (b) a plurality of electrical coils being supported by said housing in spaced relation about the periphery of said circular fan rotor opening;
   (c) a fan having a central rotor being rotatably supported by said bearing means and having a plurality of fan blades radiating from said central rotor, said fan having a circular structural member extending from said fan blades and being interconnected with the tips of said fan blades;
   (d) a plurality of permanent magnets being provided at the outer peripheral portion of said circular structural member and being positioned for close proximity with said electrical coils during rotation of said fan, said circular internal recess being traversed by said plurality of permanent magnets during rotation of said fan; and
   (e) a solid state electrical circuit for sequentially energizing said coils and commutating said permanent magnets of said fan.

2. The direct current electric fan motor of claim 1, wherein:
   said fan housing defines a circular surface of curved cross-sectional configuration forming an air entry opening for said fan housing.

3. The direct current electrical fan motor of claim 1, including:
   (a) an indexing circuit having a light emitting diode and a light sensor disposed in fixed relation with said fan housing, said light sensor being electrically connected with said solid state electrical circuit; and
   (b) a reflector being supported by said fan and adapted to sequentially reflect light signals of said light emitting diode to said light sensor, thereby causing said light sensor to emit indexing control signals in response to rotational movement of said fan.

4. The direct current electric fan motor of claim 1, wherein:

said plurality of electrical coils are supported by said fan housing in close proximity to said circular internal recess thereby permitting said plurality of permanent magnets to have close proximity to said electrical coils as they traverse said circular internal recess during rotation of said fan.

5. The direct current electrical fan motor of claim 1, wherein:
   (a) said fan housing is of circular form and defines stop means at the outer periphery thereof which is positioned for engagement with a structural member supporting said fan motor; said fan motor further comprising:
   (b) retainer means being releasably secured to said fan housing and adapted to engage said structural member to thus secure said fan motor in immovable relation with respect to said structural member.

6. The direct current electrical fan motor of claim 5, wherein:
   said retainer means is in the form of a retainer ring which is threadedly received by said fan housing.

7. The direct current electrical fan motor of claim 1, wherein:
   (a) said plurality of fan blades are formed integrally with said central rotor;
   (b) said circular structural member is formed integrally with said fan blades; and
   (c) said permanent magnets are disposed within said circular structural member and are located at the outer periphery of said circular structural member.

8. The direct current electrical fan motor of claim 7, wherein:
   (a) said fan housing is of circular form and defines an internal channel at the inner peripheral
   (b) the outer portion of said fan blades being disposed within said circular internal recess of said housing; and
   (c) said plurality of permanent magnets being located within said circular structural member in close proximity to said circular internal recess and thus being in close proximity to said permanent magnets as said permanent magnets traverse said circular internal recess during rotation of said fan.

9. The direct current electrical fan motor of claim 1, wherein:
   (a) said circular structural member defines a pair of opposed flange members forming a circular channel; and
   (b) said permanent magnets being located within said circular channel.

10. The direct current electrical fan motor of claim 1, wherein:
    (a) said fan housing defines a pair of traverse structural braces extending radially inwardly toward the center of said fan housing;
    (b) a bearing housing being supported by said transverse structural braces; and
    (c) said bearing means supporting said fan for rotation relative to said bearing housing.

11. The direct current electrical fan motor of claim 10, wherein:
    said bearing housing defines a curved surface directed upstream to air flow to thus minimize turbulence of air being drawn through said fan housing by said fan.

12. A direct current electrical fan motor for use in computers and other electrical equipment, comprising:
    (a) a generally circular fan housing forming a generally circular internal opening defining a flow passage for air, said fan housing further forming a circular internal channel;
    (b) a plurality of electrical coils being supported by said housing and being arranged in circular substantially equally spaced relation about said housing and being disposed in close proximity to said circular internal channel;
    (c) a bearing housing being supported centrally of said fan housing and having bearing means supported thereby;
    (d) a fan having a central rotor being rotatably supported by said bearing means and having a plurality of fan blades radiating from said central rotor, said fan further having a generally circular structural member extending from said fan blades and being interconnected with the tips of said plurality of fan blades;
    (e) an outer peripheral portion of said circular structural member being received within said internal channel of said fan housing;
    (f) a plurality of permanent magnets being disposed at the outer peripheral portion of said circular structural member and being positioned for close proximity with said electrical coils during rotation of said fan; and
    (g) a solid state electrical circuit for sequentially energizing said coils and commutating said permanent magnets of said fan.

13. The direct current electrical fan motor of claim 12; wherein:
    (a) said fan housing forms external abutment means positioned for supporting engagement with a structural fan support wall of said electrical equipment; said fan motor further comprising:
    (b) retainer means releasably connected with said fan housing and disposed for locking engagement with said structural fan support wall of said electrical equipment to thereby secure said fan housing relative to said structural fan support wall.

14. The direct current electrical fan motor of claim 12, wherein said circular structural member comprises:
    (a) a generally circular structural element forming a pair of opposed circular flanges having supporting engagement with the tips of each of said fan blades, said circular structural element also forming a circular channel projecting beyond the tips of said fan blades and being received within said internal channel of said fan housing; and wherein
    (b) said plurality of permanent magnets being located in spaced relation within said circular channel.

15. The direct current electrical fan motor of claim 12, including:
    (a) an indexing circuit having a light emitting diode and a light sensor disposed in fixed relation with said fan housing, said light sensor being electrically connected with said solid state electrical circuit; and
    (b) a reflector being supported by said fan and adapted to reflect light signals of said light emitting diode to said light sensor, thereby causing said light sensor to emit indexing control signal pulse in response to rotational movement of said fan.

* * * * *